United States Patent [19]

Gaylord et al.

[11] 4,365,776

[45] Dec. 28, 1982

[54] DOUBLE SAFETY MANUALLY RELEASABLE STRAP CONNECTOR

[75] Inventors: John A. Gaylord, San Diego; Kenneth A. Marks, Cherry Valley, both of Calif.

[73] Assignee: H. Koch & Sons, Div. of Gulf & Western Mfg. Co., Anaheim, Calif.

[21] Appl. No.: 255,322

[22] Filed: Apr. 17, 1981

[51] Int. Cl.³ ..................... B64D 17/30; A44B 11/25
[52] U.S. Cl. ............................ 244/151 A; 24/230 A
[58] Field of Search ........... 244/151 R, 151 A, 151 B; 294/83 A, 83 AB; 24/230 R, 230 A, 230 AL, 230 AK

[56] References Cited

U.S. PATENT DOCUMENTS

| | | | |
|---|---|---|---|
| 2,504,125 | 4/1950 | Hight | 294/83 |
| 2,574,296 | 11/1951 | Smith | 244/151 B |
| 3,555,634 | 1/1971 | Brown | 24/230 |
| 3,964,138 | 6/1976 | Gaylord | 24/230 A |
| 4,095,314 | 6/1978 | Gaylord | 24/230 A |

Primary Examiner—Charles E. Frankfort
Attorney, Agent, or Firm—Alfons Puishes

[57] ABSTRACT

A double safety manually releasable strap connector employs a male and a female member and latching devices to releasably connect the same, including a rotatable inter-connecting element in the female member. A manipulating lever is connected to the rotatable inter-connecting element for pivotal movement away from the female member. A first latch to prevent the pivotal movement of the lever for rotating the inter-connecting element being releasable by sliding the lever, and a second latch for locking the sleeve against the sliding movement. The male member is adapted to hold the riser of the canopy shrouds of a parachute and the female member is adapted to hold straps of the harness for the parachute.

12 Claims, 10 Drawing Figures

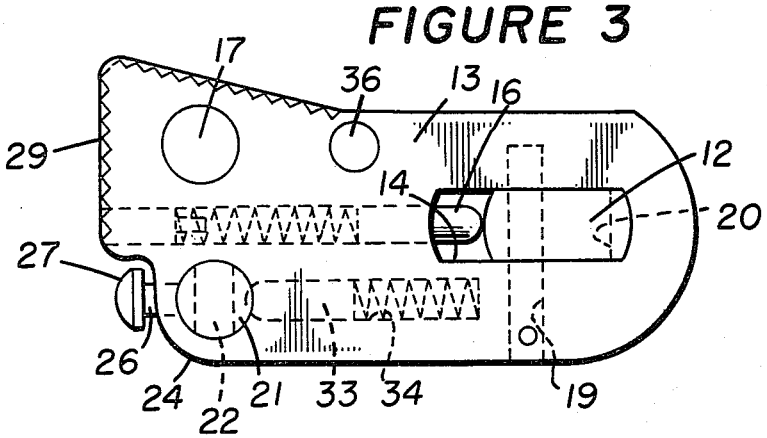
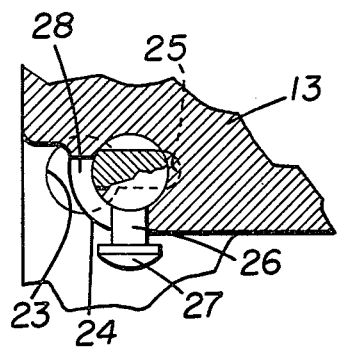
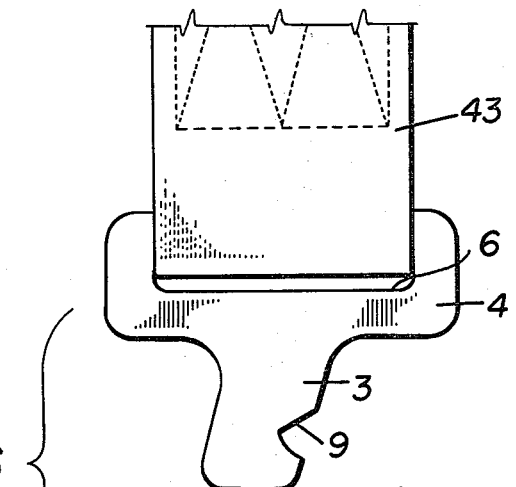
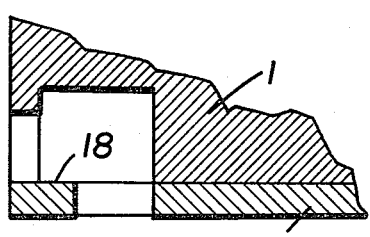
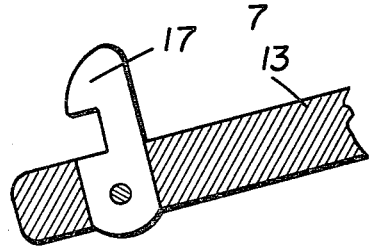
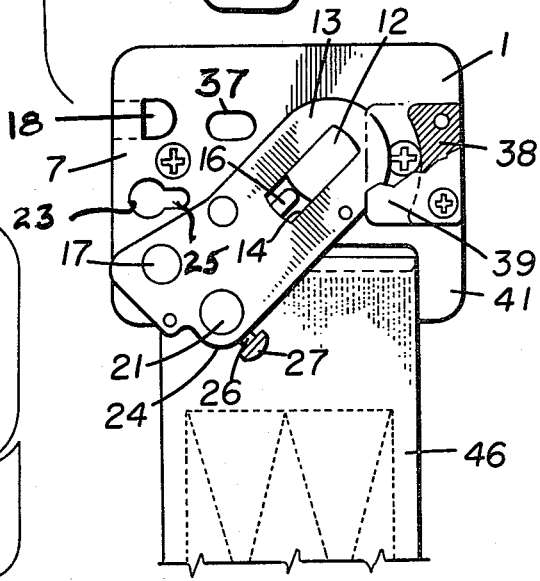

DOUBLE SAFETY MANUALLY RELEASABLE STRAP CONNECTOR

BACKGROUND OF THE INVENTION

The problem of releasing a strap for a parachute canopy readily and conveniently and also holding it in position and preventing premature release with possible fatal consequences to the user, continues to be a problem despite numerous devices which have been constructed for this purpose when used with a parachute. The shock attending initial opening of the parachute is one of the contributing problems. Other factors which can cause premature opening and consequent disaster are striking of the release device against other objects and inadvertent release of the mechanism by the operator. A typical item in the prior art is U.S. Pat. No. 4,095,314 for Shock Load Resistant Canopy Release by one of the present inventors.

Despite the number of devices which have been constructed for this purpose there is still need for a device which would provide complete safety against premature release from whatever cause, and at the same time be simple enough to be readily operated by the user when the time is proper.

SUMMARY OF THE INVENTION

We have invented a device which fulfills the requirements enumerated above and eliminates the disadvantages of previous devices, by providing easily releasable double safety latches. A rotating element in the female member interlocks with the male member and can be rotated into a position to free the male member to be pulled out by the strap thereon. This rotating element is turned by a lever from interlocking to a freeing position. The lever is slidable on the female member and a first latch prevents the sliding of the lever into position for turning said rotatable element. This first latch is releasable by sliding said lever toward said rotating element. After the freeing of the first latch by sliding said lever, the same can be lifted pivotally away from the female member, thereby freeing it for turning movement for rotating said rotating element. A second latch interlocks the lever with the female member in such a manner that it prevents its sliding into said turning attitude. This second latch includes a locking pin which is turnable in a recess in the female member from a locking position into an unlocked position. Both latching devices are conveniently located so that they can be manipulated by one hand, first turning the second latch to unlocking position and then sliding the lever to release the first latch, then lifting the lever about its hinge pivot and then turning it so as to rotate said rotating element into position to release the male member from the female member. This is particularly useful and important in connection with releasing the shrouds of the canopy of a parachute from the parachute harness.

DESCRIPTION OF THE FIGURES

FIG. 3 is a front view of the swivelling lever of FIG. 1 in locked horizontal position.

FIG. 4 is an elevation, partly in section, showing the lever unlocked for sliding movement.

FIG. 5 is a partial cutaway view of the female member, the cover and the swivelling lever with the hook of the lever in unlatched position.

FIG. 6 is a view showing the device after turning of the lever and disconnecting the male member.

DESCRIPTION OF A PREFERRED EMBODIMENT

Figure 1:
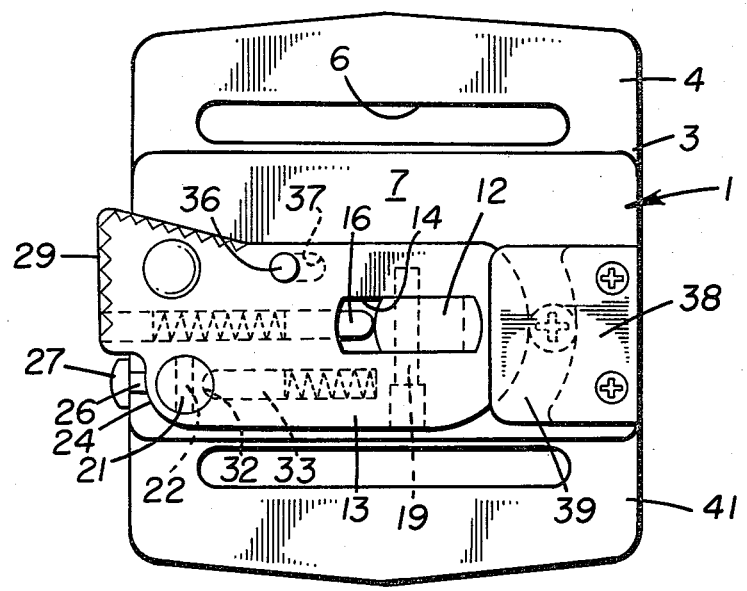
FIG. 1 is a front elevation assembly of the device in a locked position.

A female member 1 has a cavity 2 therein complemental to a male member 3 for insertion therein. The male member 3 has a head 4 with a slot 6 therein to accommodate a strap such as a riser from the shrouds of the canopy of a parachute. In this illustration the cavity 2 of the female member is covered by a cover plate 7 with suitable recesses for the locking and release devices. A rotatable element such as a dog 8 is transversely extended in the female member. The male member has a notch 9 therein engageable by a corner of a cutaway portion in the dog 8 in such a manner that in one position of the dog 8 a corner of the cutaway portion 11 inter-connects with the notch 9 and prevents freeing of the male member 3, and in another position the cutaway portion is withdrawn from the notch 9 freeing the male member for removal.

The free end of the dog 8 is in the shape of a flat lug 12 and it is beyond the cover plate 7. A lever 13 has therein an elongated slot 14 so that when the lever is turned it rotates the dog 8 from an interlocking position to a freeing position or vice-versa. A spring pressed plunger 16 longitudinally held in the lever 13 bears against the lug 12 so as to urge the lever 13 away from the lug 12 into an initial locked position.

The first latch forming the first safety device for the operation of the lever 13 is a detent such as a hook 17 which extends from the free end of the lever 13, farthest from the lug 12, into a recess 18 of the female member so that in the initial position the hook hooks under an edge of the cover plate 7 at said recess 18. This prevents the lifting of the lever 13 away from the female member 1 for turning the dog 8. The spring pressed plunger urges the sliding lever so that it yieldably holds the hook in the hooked position. A cross pin 19 extends through an elongated slot 20 in the lug 12 into the adjacent part of the lever 13 to form a pivot so that the lever is hingedly connected to the lug 12 for pivotal movement away from and toward the plate 7.

The second safety device is a second latch which consists of a latch pin 21 which has a cross head 22 projecting from the lower face of the lever 13 into a cylindrical recess 23. In a rounded corner 24 of the free end of the lever 13 a lateral arm 26 extends from the latch pin 21 with a button 27 at its outer end. The arm 26 is confined and rides in a curved slot 28 around said corner so as to turn the cross head 22 across the cylindrical recess 23 or into registry with a slot 25 extending from said recess 23 longitudinally of the lever 13. When the cross head 22 of the latch pin 21 is out of registry relatively to the slot 28 it obstructs the sliding of the lever 13, but when in registry it is moved into the slot 25 as the lever 13 is slid toward the lug 12. The end of the lever 13 adjacent said latch devices is knurled to facilitate manipulation. The arm 26 also extends through the latch pin 21 and has its inner end concave, namely dished at 32 so that it is frictionally engaged by the rounded tip of a spring pressed plunger 33 in a pocket 34 longitudinal in the lever 13 thereby to yieldably resist movement of the latch pin 21 with sufficient resistance to prevent accidental release.

A guide lug 36 extends from the underside of the lever 13 at about the middle between the ends thereof and is engageable with an elongated guide slot 37 in the plate 7 to guide the lever 13 in its sliding movement.

Figure 9:
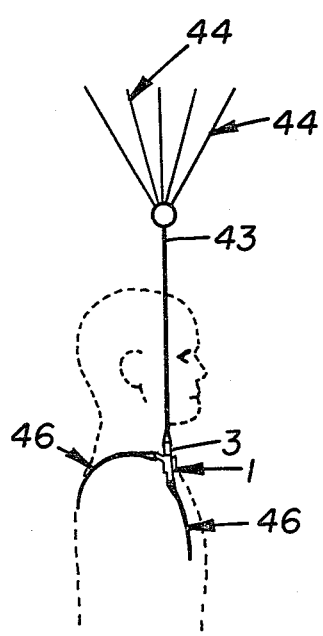
FIG. 9 is a view showing the use of the connector connecting the riser of the canopy shrouds with the harness straps.
Figure 10:
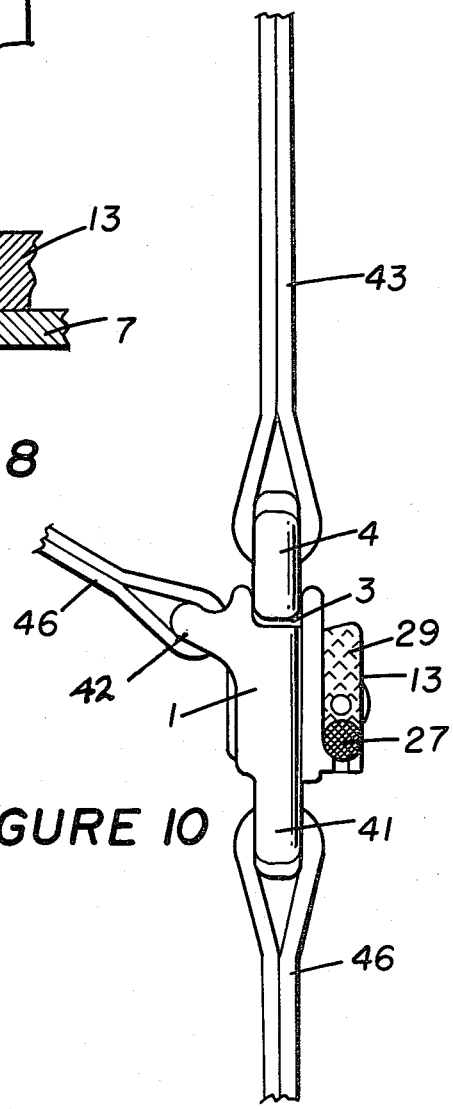
FIG. 10 is a side view of the connector device showing the riser and harness straps in place.

At the pivoted end of the lever 13, and spaced therefrom to permit said sliding movement, is a guard 38 extending from the plate 7. A guard tongue 39 extends from the top of the guard 38 over the pivoted end of the lever 13 in order to positively prevent the entangling of any riser 43 or shroud lines 44 with this disconnect device. This is particularly important when this device is used to connect the riser 43 of the shroud lines 44 of a canopy to the straps 46 of a parachute harness as shown in FIGS. 9 and 10.

The female member 1 herein has a slotted extension 41 from its free edge and another slotted extension 42 from its back to hold straps 46 of a parachute harness.

OPERATION

The operation of the herein device is best understood by reference to FIG. 1 and FIG. 4 which show the device respectively in connected and disconnected attitudes.

Figure 2:
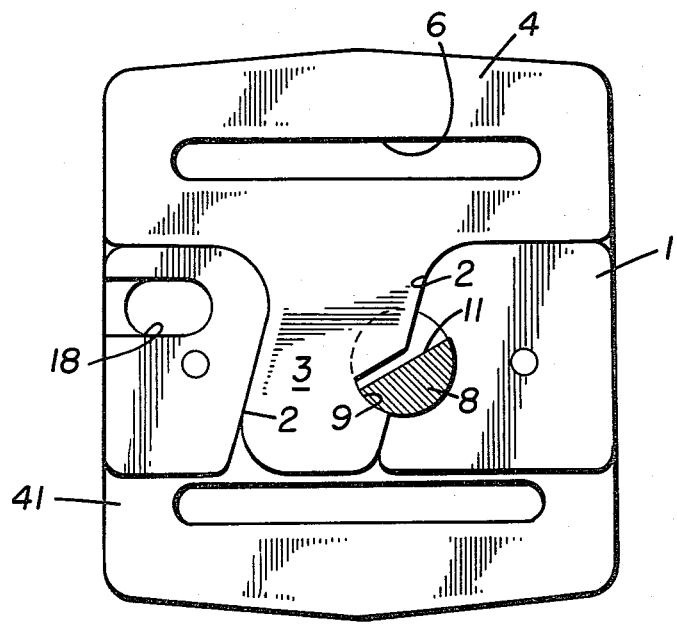
FIG. 2 is a front elevation with the cover removed and the device still in a locked position.
Figure 7:
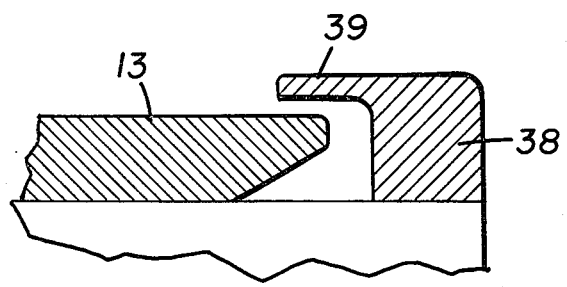
FIG. 7 is a fragmental sectional view of the snag guard.
Figure 8:
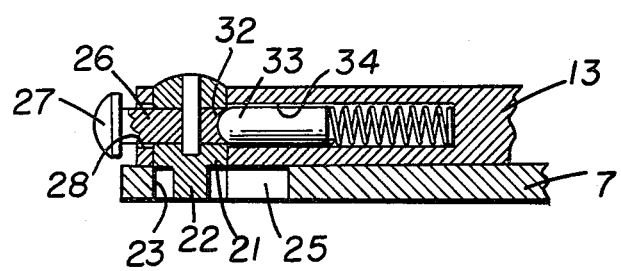
FIG. 8 is a fragmental view of the locking end of the lever on the cover plate, showing the second latch device in locked position.

For connecting the male member 3, it is inserted in the female member, and the lever 13 is turned in clockwise direction so as to rotate the dog 8 into engagement with the notch 9, as shown in FIG. 2. Then the lever is lowered to the plate 7 so that the hook 17 is located in the recess 18. The spring pressed plunger 16 slides the lever 13 to push the hook 17 under the edge of the plate 7. This fastens the first latch to hold the lever 13 in interconnecting position.

Then the user pulls the button 27 and its arm 26 from the position shown in FIG. 6 into the position shown in FIG. 1, thereby turning the latch pin 21 so that its crosshead 22 is out of registry with the longitudinal slot 25 of the recess 23 and is held in that locked attitude by the spring pressed plunger 33.

By employing the herein double latching combination complete safety from accidental or premature release of the canopy is achieved.

The manipulation for disconnect is simple because the user is able to manipulate both latches rapidly, by pushing the latch button 27 around the corner of the lever 13 to release the second latch and then pushing the knurled end of the lever 13 against the action of the spring pressed plunger 16 and pivoting and turning the lever 13 to withdraw the dog 8 from the notch 9 of the male member 3.

We claim:

1. In a double safety manually operated strap connector device comprising:
a female member;
a strap holder on said female member;
a male member insertable into said female member;
a strap holder on said male member;
rotatable inter-connecting means in said female member releasably interlocking with said male member;
manipulatable operating means on the female member for rotating said inter-connecting means into and out of interconnecting attitude;
the improvement of
a turning element projecting to the outside of said female member from said inter-connecting means;
a lever on said female member for turning said turning element for rotating said inter-connecting means, said lever being slidable and turnable on said female member;
a first latching device on said lever releasably engaging said female member to prevent turning of said lever and being releasable by sliding said lever;
a second latching device on said lever locking said lever against sliding;
manipulatable means for releasing said second latching device thereby to permit sliding of said lever so as to release said first latching device and permit sliding and turning said lever for rotating said inter-connecting means for engaging an disengaging said male member.

2. The strap connector specified in claim 1,
said first latching device including
a detent spaced from said turning element of said interconnecting means;
a detent engaging element on said female member for said detent;
said detent interlocking with said detent engaging element so as to prevent turning of said lever, and being releasable by sliding said lever to disengage said detent from said detent engaging element;
first spring loaded means urging said lever into position wherein said detent is interlocked with said detent engaging element;
said lever being slidable by manipulation against said urging by said spring loaded means when said second latching device is unlocked.

3. The strap connector specified in claim 2 and said detent being a hook and said detent engaging element being a recess in said female member engageable by said hook so as to permit sliding of said lever but prevent turning of said lever.

4. The strap connector specified in claim 1, or 2 or 3, and
said second latching means including
a latch element rotatable in said lever;
a locking projection extended from said latching element toward the female member;
locking means on the female member for locking said locking projection so as to prevent sliding of said lever;
and manipulatable means for rotating said latching element thereby to move said locking projection into and out of locking position relative to said locking means at will.

5. The strap connector specified in claims 1 or 2, and said manipulatable means for releasing said second latching device being an extension from said second latching device to outside of said lever for rotating said second latching device into and out of latching position.

6. The strap connector specified in claims 1 or 2, and said manipulatable means for said second latching device including
a rotatable latch element,
a laterally extended handle arm on said latch element, said lever having an arcuate guide to accommodate said arm on an arc for rotating said latching element into and out of latching position,
and spring loaded means to retard rotation of said latch element.

7. The strap connector specified in claims 1 or 2, and
second spring loaded means to resist accidental release of said second latching device.

8. The strap connector specified in claims 1 or 2, and
said second latching device including,
a latch pin forming a rotatable latch element journaled in said lever, and being in registry with a recess in the female member;
a cross-head on the adjacent end of said latch pin rotatable in said recess,
said recess being substantially cylindrical and having an extension slot longitudinal to the lever and capable of receiving said cross-head when turned into registry therewith, said slot extending toward said turning element thereby to permit sliding of said lever when said cross-head is in registry with said longitudinal extension slot, and to block longitudinal movement of said cross-head and sliding of said lever when said cross-head is positioned out of registry with said extension slot.

9. The strap connector specified in claims 1 or 2, and
a riser strap for parachute shroud lines connected to said male member;
and means to connect parachute harness straps to said female member.

10. The strap connector specified in claims 1 or 2, and
a riser strap for parachute shroud lines connected to said male member;
and parachute harness straps connected to said female member;
a guard on said female member spaced from the adjacent end of said lever to prevent entangling of said shroud lines or other straps with said lever.

11. The strap connector specified in claims 1 or 2, and
a riser strap for parachute shroud lines connected to said male member;
and parachute harness straps connected to said female member;
a guard on said female member spaced from the adjacent end of said lever to prevent entangling of said shroud lines or other straps with said lever;
and a protecting tongue on said guard overlapping said end of said lever.

12. The strap connector specified in claims 1 or 2, and
guide means for guiding said lever during its sliding and to locate the respective latch devices in operative positions.

* * * * *